March 25, 1930.  W. L. TRULLINGER  1,751,774
MOVABLE CAMERA SUPPORT
Filed May 24, 1927  2 Sheets-Sheet 2

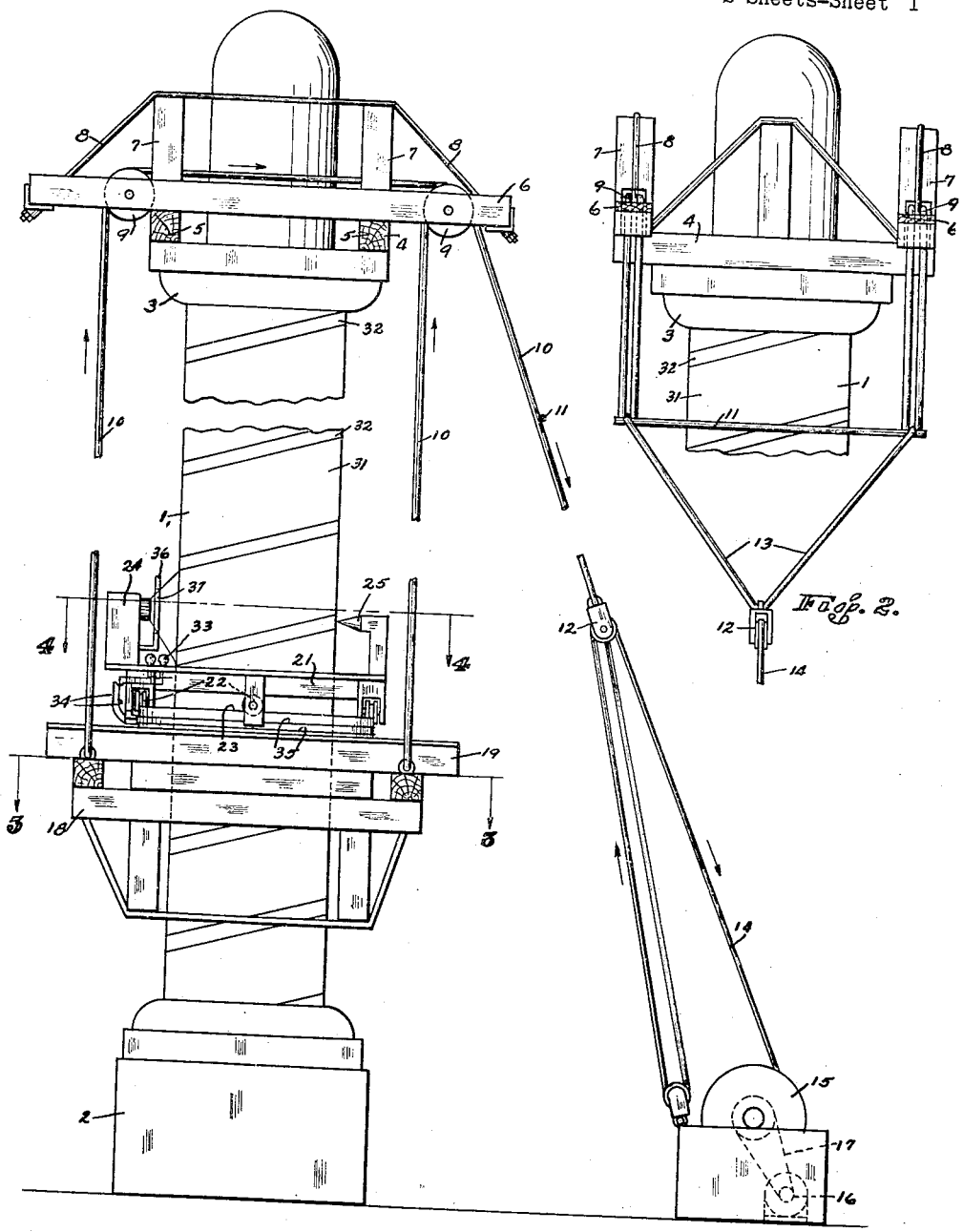

INVENTOR
W. L. TRULLINGER
BY
ATTORNEYS.

Patented Mar. 25, 1930

1,751,774

UNITED STATES PATENT OFFICE

WILLIAM L. TRULLINGER, OF ASTORIA, OREGON

MOVABLE CAMERA SUPPORT

Application filed May 24, 1927. Serial No. 193,936.

My invention relates to improvements in movable camera supports and it consists in the combinations, constructions and arrangements hereinafter described and claimed.

An object of my invention is to provide a movable camera support which is adapted to move a camera in spiral convolutions about the exterior of a column for taking pictures of the exterior of the column.

A further object of my invention is to provide a device of the type described which is simple in construction and which makes use of means for keeping the camera lined up with the objects on the column being photographed.

Other objects and advantages will appear in the following specification, and the novel features of my invention will be particularly pointed out in the appended claims.

My invention is illustrated in the accompanying drawings, in which

Figure 1 is a side elevation of the device;

Figure 2 is an elevation of the top of the device taken at right angles to that shown in Figure 1;

Figure 3:
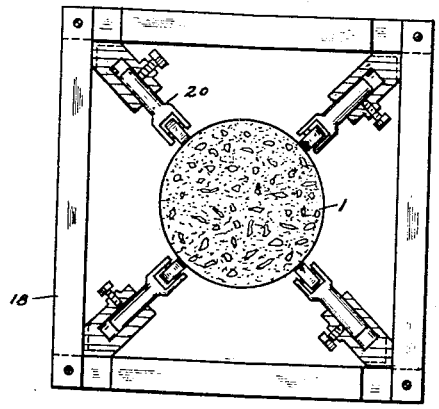
Figure 3 is a section along the line 3—3 of Figure 1.

Certain cities have columns which depict historical events which have transpired in their vicinity, and it is the object of the present invention to provide movable means for supporting a camera so that the pictures on the surface of the column may be photographed. The present invention contemplates taking pictures which are disposed in a plurality of circles about a column, or in a ribbon-like spiral wound around and up the column. The drawings show the form of the column as having a spiral ribbon with numerous pictures thereon, this ribbon extending from the base of the column to a short distance from the top thereof.

In Figure 1 it will be noted that the column 1 is supported by a base 2 and has a cap 3 on its top. I mount a super-structure 4 on the cap, this structure comprising parallel pieces 5 and cross pieces 6. Pieces 5 and 6 are secured to each other and are braced by uprights 7 and struts 8. The super-structure 4 carries pulleys 9 over which cables 10 are disposed. There are four of these pulleys and four cables. The cables are connected to a common spreader 11 and the spreader in turn is secured to a block and tackle 12 by connecting members 13. The block and tackle 12 carries a cable 14 which has its free end wrapped around a drum 15 and secured thereto. The drum is actuated by a motor 16 which is operatively connected to the drum 15 by the mechanism shown in Figure 1 at 17. It will be seen from this construction that a winding up of the cable 14 upon the drum 15 will simultaneously lift all four cables 10 and that an unwinding of the drum will lower the cables.

The lower end of the cables 10 are connected to a hanging stage 18 suitably braced in much the same manner as the super-structure 4. The stage supports a platform 19 upon which the operator stands when taking pictures of the column. Figure 3 clearly shows how the stage encircles the column 1 and how it is spaced from the column by adjustable rollers 20. The rollers 20 are preferably provided with rubber tires so that they will not mar the surface of the column. The rollers not only position the hanging stage 18 with respect to the column 1, but may also be adjusted to take up any space between the column and the stage, as for example when the column is of the tapering type, in which event the rollers will be spaced further away from the vertical axis of the column at a point adjacent to the base than when at a point adjacent to the top.

Upon the platform 19 I mount a turn-table 21 which is supported by rollers 22, these rollers being carried by a single track 23 carried by the platform 19. The turn-table supports a camera 24 which may be of the moving picture type or a type for taking a continuous picture and also supports a pointer arm 25. The pointer arm is positioned diametrically opposite from the camera and the point of the arm 25 is aligned with the lens of the camera.

From the foregoing description of the various parts of the device, the operation thereof will be readily understood.

Figure 4:
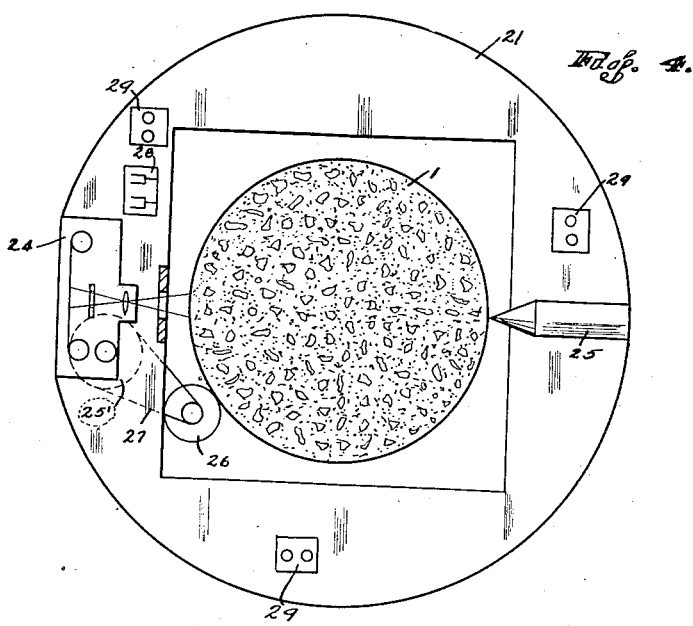
Figure 4 is a section along the line 4—4 of Figure 1.

As heretofore stated two operators mount the platform 19, one of them manning the camera 24. Another operator takes his place adjacent to the hoisting mechanism 15. Figure 4 shows how the actuating mechanism of the camera indicated by a wheel 25, is operatively connected to a wheel 26 by a belt 27, or other suitable connecting medium. The wheel 26 frictionally engages with the column 1 and a rotation of the turntable 21 about the column will cause the wheel 26 to rotate and in turn to actuate the mechanism of the moving picture camera. Of course, the speed ratio between the rotating wheel 26 and the mechanism for moving the film past the camera aperture at the required speed is ascertained so that the camera will function properly. If desired, the camera can be operated by hand or it can be operated by an electric motor.

A system of signal lights is installed so that the camera operator can indicate his intentions to the control man who stands beside the pointer 25. This is indicated by switches 28 disposed adjacent to the camera man and signal lights 29 disposed at three equally spaced distances around the platform 19. The lights 29 are so arranged that the operator controlling the drum 15 can see at least one of the sets of lights at all times.

The column 1 has a ribbon-like band 31 encircling it, the adjacent layers being separated by a border strip 32. The operator positions the pointer 25 opposite the border strip 32 and when the pointer is in this position the camera 24 is focused properly for taking pictures of the portion of the band 31 disposed directly in front of the camera. The pictures are preferably taken at night so as to obtain uniform lighting effects and the lights 33 of the desired intensity are mounted in proper positions for illuminating the column. Wires 34 lead from the lights 33 to conductor rings 35. These rings in turn are in electrical connection with a source of current and thus provide means for connecting the lights with the source of current and at the same time permitting the turn-table 21 to be revolved upon the platform 19.

A screen 36 is positioned in front of the camera aperture and has an opening 37 therein for causing the camera to take a picture of a predetermined portion of the column, this portion preferably being the height of the band 31 and a width which will not show the curvature of the band about the column. The operator standing by the pointer 25 moves the turn-table 21 about the platform 19 in acordance with the signals transmitted to him by the camera operator. The rotation of the turn-table 21 will be slow and so will also the vertical movement of the hanging stage 18. The operator controlling the drum 15 can instantly raise or lower the hanging stage and regulate its movement at the desired speed, while the operator on the platform 19 can rotate the turn-table 21 at the speed desired by the camera man. As heretofore stated, the instructions of the camera man are given to the two operators by the signal lights 29.

Although I have shown and described one embodiment of my invention, it is to be understood that the same is susceptible of various changes and I reserve the right to employ such changes as may come within the scope of the appended claims.

I claim:

1. A device of the type described comprising a frame for encircling a column having a spiral picture thereon, a turn-table carried by said frame, a camera mounted upon said turn-table, a pointer carried by said turn-table for indicating the position of the camera with respect to the picture on the column and means for raising and lowering said frame.

2. A movable camera support comprising a frame for encircling a column having a spiral picture thereon, a turn-table carried by said frame, a camera mounted upon said frame, a pointer carried by said turn-table, the end of said pointer registering with the marginal edge of the picture for centering the camera with respect to the picture on the column, and means for moving said frame spirally for causing the camera to follow the spiral picture.

3. A movable camera support for encircling a column having a spiral picture thereon, a continuous picture-taking camera mounted on said support, means for moving said support around said column and for advancing the support for causing the camera to take a path conforming with the spiral of the picture on the column, and means contacting with said column for actuating the camera mechanism and for synchronizing the camera film with the movement of the camera.

WILLIAM L. TRULLINGER.